(No Model.) 2 Sheets—Sheet 1.
F. A. BROWNELL.
CAMERA ATTACHMENT.
No. 388,259. Patented Aug. 21, 1888.
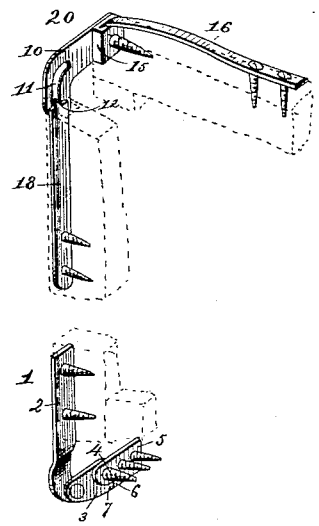
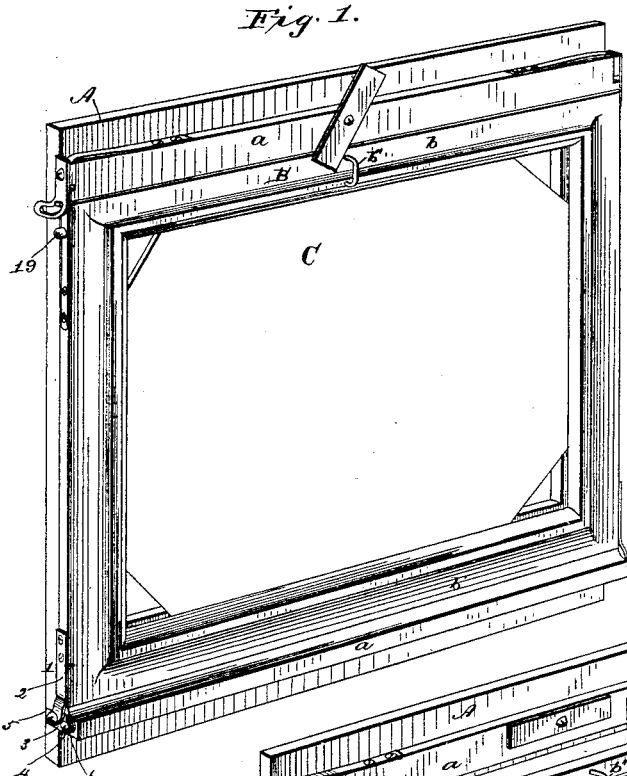
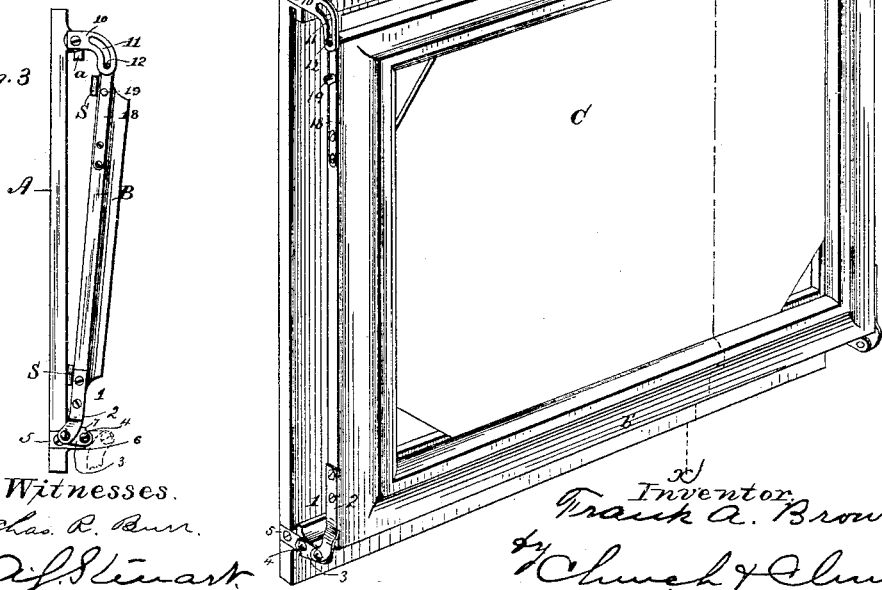
Witnesses
Chas. R. Burr
A. J. Stewart
Inventor
Frank A. Brownell
by Church & Church
his Attorneys
N. PETERS, Photo-Lithographer, Washington, D. C.

(No Model.) 2 Sheets—Sheet 2.

F. A. BROWNELL.
CAMERA ATTACHMENT.

No. 388,259. Patented Aug. 21, 1888.

Witnesses.
Chas. R. Burr.
A. J. Stewart.

Inventor.
Frank A. Brownell.
by Church & Church.
his Attorneys.

UNITED STATES PATENT OFFICE.

FRANK A. BROWNELL, OF ROCHESTER, NEW YORK, ASSIGNOR TO THE EASTMAN DRY PLATE AND FILM COMPANY, OF SAME PLACE.

CAMERA ATTACHMENT.

SPECIFICATION forming part of Letters Patent No. 388,259, dated August 21, 1888.

Application filed October 1, 1887. Serial No. 251,212. (No model.)

*To all whom it may concern:*

Be it known that I, FRANK A. BROWNELL, of Rochester, in the county of Monroe and State of New York, have invented certain new and useful Improvements in Camera Attachments; and I do hereby declare the following to be a full, clear, and exact description of the same, reference being had to the accompanying drawings, forming a part of this specification, and to the figures and letters of reference marked thereon.

This invention relates to improvements in camera-boxes, or, more properly, to that part of the camera-frame to which the focusing-glass and plate-holder are applied; and it consists in the arrangement, construction, and combination of parts for supporting the frame containing the ground glass, as hereinafter more fully described, and pointed out in the claims.

Figure 5:
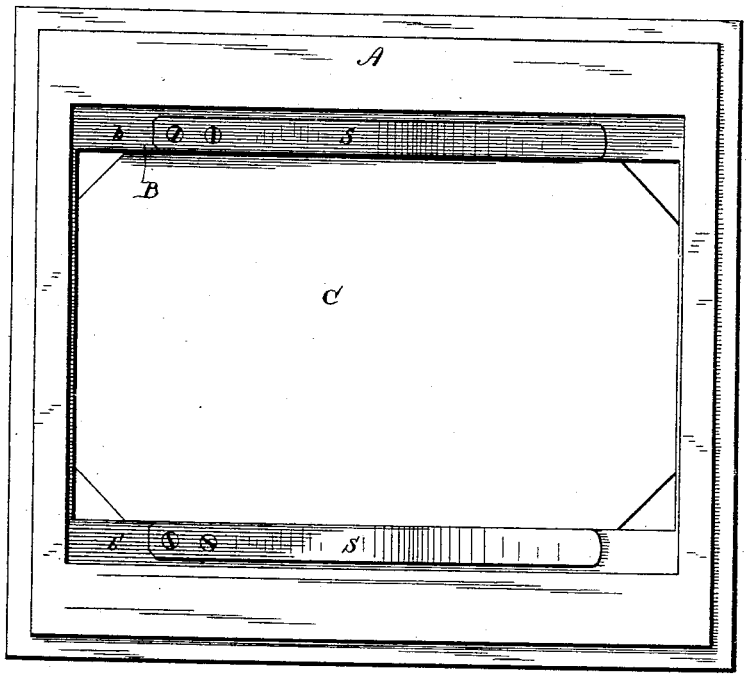
Figure 6:
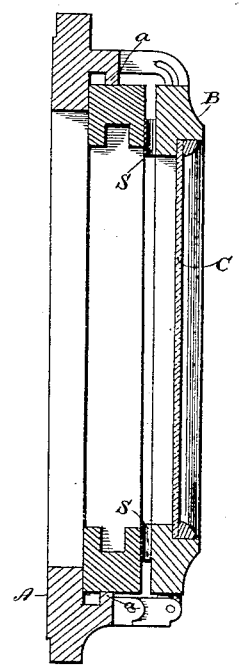

In the accompanying drawings, Figure 1 is a view in perspective of a device embodying my improvements, the ground-glass frame being in closed position. Fig. 2 is a view in perspective representing the ground-glass or focusing frame retracted. Fig. 3 is an end view representing the ground-glass frame partially retracted. Fig. 4 is a detail view representing the fittings for one end of the frame. Fig. 5 is a view of ground-glass frame, looking toward the inner face thereof. Fig. 6 is a section on line $x\ x$, Fig. 2, with a plate-holder added.

Similar letters of reference in the several figures indicate the same parts.

The letter A designates a frame forming the rear of the camera-box, to which latter it is attached, either permanently or removably, in the usual manner. On the outer face of this frame are formed or applied suitable supports for the reception and retention of the plate-holder in rear of the camera-box with the plate in the proper focal position. In the illustration given the plate-holder, being formed or provided with grooves in opposite edges, is received and held between parallel ribs $a$, while suitable shoulders at opposite ends of the the frame A, co-operating with shoulders on the plate-holder, serve to prevent the admission of light when the plate-holder is in position and the plate exposed within the camera-box.

A frame, B, carrying the ground glass C, is fitted to the rear face of the frame A, the opposite ends, $b\ b'$, being received in the space between the ribs $a$, so that the ground-glass or focusing plate C will occupy the same position relative to the lens as the sensitive plate when inserted preparatory to exposure.

The devices as thus far described do not differ essentially in construction or mode of operation from similar devices heretofore used; hence further explanation as to their form and use is unnecessary. The method of supporting and manipulating the ground-glass or focusing frame is, however, novel, so far as I am advised.

One side of the frame B, and preferably at opposite ends thereof, is attached to the frame A by movable connections or double hinge 1—that is to say, by a connection which will permit the frame to move or oscillate toward and from the frame A and hold it securely and firmly in either position. A connection of the character described is illustrated in the drawings, comprising an arm or plate, 2, secured to the frame B, and a link or plate, 3, interposed between and pivotally connecting the arm 2 and frame A. The pivot-pin 4, connecting link 3 and frame A, is connected to or passed through a plate, 5, secured to the frame A, and upon said plate 5 is formed a stop or shoulder, 6, which, co-operating with a shoulder or stop, 7, on the link 3, limits the outward or downward movement of the latter.

The upper or opposite side of the frame B is attached to the frame A by a combined sliding and oscillating connection, 20—that is to say, a connection which will permit of a longitudinal movement of the upper portion of the frame B as its lower portion swings in the arc of a circle and a lateral movement to advance or withdraw the upper portion of the frame. A connection embodying these features consists, essentially, of a link, 10, pivotally attached to the frame A, and provided with a curved slot or guide, 11, to receive a pin, 12, on the frame B. The connections shown permit of the adjustment of the frame B toward and from the frame A and its retention parallel with the rear face of the frame A either at a distance just sufficient for the insertion of the plate-holder, or between the ribs

*a* and in the position occupied by the plate-holder when in place.

The movements in adjusting the frame B are as follows: When the ground glass is in position for focusing the object, it rests against the rear of frame A and between the ribs *a* thereon. In this position the links 3 are folded back, and the pivot-pins, connecting-arms 2, and said links are in rear of or between the pins 4 and frame A, while the links 10 are folded down, as shown, with the pins 12 at the inner ends of the guideways 11. When the proper focus has been obtained and the plate-holder is to be inserted, the upper side of the frame B is drawn outward by means of a handle, *b*, or other suitable means, thereby elevating the links 10 and causing the frame B to be oscillated slightly on the lower connection. The frame B is now elevated or drawn toward the links 10, the pins riding in the slots 11 until the links 3 have reached or passed the vertical center, after which the frame B is moved down or backward until the shoulder 6 engages the stop 7 and prevents further movement of the links 3. The pins 12 on the upper side of the frame now rest at the outer extremities of the guides or slots 11 in arms 10, which latter, together with the links 3, serve to hold the frame *b* securely in position in rear of frame A, so that the plate-holder can readily be inserted.

If desired, the arms 2 may make contact with the heads of pins 4 when the frame B is closed against the frame A, to serve as steps for limiting the inward or downward movement of links 3.

To facilitate the adjustment of the frame and to assist in holding it in adjusted position, the arms or links 10 are formed or provided with angular bearings 15, with which flat springs 16 co-operate. When the arms are in their elevated and depressed positions, the springs bear upon flat surfaces of the bearings 15, and as the latter are turned the springs are raised or compressed by the corners or shoulders and the pressure transferred from one side of the center to the other side.

It is sometimes necessary or desirable that the ground glass be removed from the back of the camera-box to permit access to be had to the interior, or for the purpose of applying different plate-holders or other attachments, such as the Eastman roll-holder. With this end in view I make the connection at the upper side of the frame B detachable or separable, so that upon freeing the upper edge the frame B can be swung back and out of the way, the connections on the bottom side permitting the frame B to swing clear of the supports for the plate-holder. Thus in the example illustrated I mount or support the pins 12, which form the connection between frame B and links 10, on springs 18, secured to the ends of the frame B, and arranged to enter slots in the frame when pressure is applied to the knobs 19.

Any other suitable or equivalent detachable connection may be substituted for the spring-pins shown.

Unless a grooved plate-holder is to be employed, it is not necessary to provide the supporting-strips *a* with ribs forming ways. It is, however, desirable that the ribs *a* be applied in order that either grooved or plane-edge plate holders may be inserted and held.

To insure proper contact between the inner face of plate-holder (grooved or plane) and the frame A and form a light-tight joint, I locate elastic pressure devices on the inner face of frame B, preferably on top and bottom bars, *b b'*. These devices, bearing against the frame of the plate-holder, press and hold the latter toward the camera-frame A, and at the same time serve to hold the ground-glass frame B retracted and slightly removed from the outer face of plate-holder.

Convenient forms of elastic pressure devices are shown in Fig. 5, consisting each of a flat and slightly-curved strip, S, of metal, secured at one end and resting loosely at the opposite end upon the frame B. The springs S are so located and applied to the inner face of the frame B that when the ground glass is closed against frame A for focusing purposes they will be received within the opening in frame A without being compressed.

In Fig. 6 I have shown a section of a plate-holder without grooves and resting upon the face of ribs *a*, with the springs applied to frame B to hold the plate-holder pressed against the face of frame A.

Having thus described my invention, what I claim as new is—

1. The combination, in a camera, of the frame A, ground-glass frame B, and intermediate connections such as described, consisting, essentially, of a double pivoted or hinge joint, 1, on one side of the frame B and a sliding and pivoted connection, 20, on the opposite side, substantially as described.

2. In a camera attachment, the combination, with the frames A and B, of the links interposed between and pivoted to both frames on one side thereof, and links pivoted to one of said frames on the side opposite the first-named links, and provided with ways for the reception of pins on the other frame, substantially as described.

3. In combination with the frame A, provided with ways for a plate-holder, the ground glass B, adapted to enter between said ways, and connected to frame A on one side by a double pivoted or hinge connection, 1, and on the opposite side by pivoted links having curved grooves or ways for the reception of retaining-pins, substantially as described, whereby the frame B can be oscillated on the double-hinge connection, so as to occupy a position in rear of or against the frame A, as set forth.

4. In a camera attachment such as indicated, the combination, with the frame A, of the frame B, carrying arms 2, and links 3, the latter pivoted to said arms and to the frame A at a point intermediate the positions occupied by the pivots connecting links 3 and arms 2 when the latter are at the extremes of their movement, substantially as described.

5. In combination with frames A and B and the interposed pivoted links 3, the slotted and pivoted links 10, and the pins engaging said slotted links, substantially as described.

6. In combination with the frame A and its ribs or ways a, the frame B, adapted to enter between said ribs and connected to the frame A by pivoted links 3 on one side, and a detachable connection on the opposite side, substantially as described.

7. In combination with the frame A, the adjustable frame B, carrying inwardly-projecting arms 2 on one side and at opposite ends thereof, and links 3, pivotally attached to said arms and to the frame A, and provided with a stop to limit the outward or downward movement of said links, substantially as described.

8. In a camera attachment such as described, and in combination with the frame attached on one side to the frame A by a movable or adjustable connection, the links 10, pivotally connected at one end to the frame A and provided with downwardly or inwardly slotted portions, and pins mounted upon the frame B and engaging said slotted portions of the links 10, substantially as and for the purpose set forth.

9. In a camera attachment such as described, and in combination with the frame B, attached at the lower side to the frame A by a hinge or pivoted connection which will permit said lower side to be adjusted toward and from the frame A, the slotted folding links 10, and the detachable pins on frame B, engaging said links, substantially as described, to sustain the upper side of the frame B in adjusted position and permit it to be detached and swung back, as set forth.

10. In a camera attachment such as described, the combination of the frame B, provided with pins 12 on the ends of one side and arms 2 on the opposite side, links 3, pivoted to arms 2 and the frame A, and links 10, pivoted to the frame A and provided with slotted portions 11 for the reception of pins 12, substantially as described.

11. In combination with the frame B, attached to frame A by a double connection, 1, and provided with pins 12, the slotted and pivoted links or arms 10, provided with angular bearing-blocks, and the springs resting upon or bearing against said bearing-blocks, substantially as described.

12. In a camera attachment such as described, and in combination with the pivoted arm or link 10, slotted for the reception of a pin, 12, on a movable frame, the angular bearings applied to or formed on said arm, and a spring engaging said bearings to retain said arm in adjusted position, substantially as described.

13. In a camera attachment such as described, and in combination with the frame B, connected on the lower side to the frame A, as described, to permit said lower side to be adjusted toward and away from frame A, the spring-plate mounted in the frame B and carrying pins for engaging links or supports connected to frame A, substantially as described.

14. The combination, with the frame A, of the camera box provided with ways or supports for the plate-holder, a ground-glass frame connected at opposite sides to the frame A, so as to swing behind and parallel with the rear face of frame A or against the latter, and a spring or elastic pressure device, S, attached to and carried by the said ground-glass frame and adapted to engage the plate-holder, substantially as described.

15. The combination, in a camera and with frame A and its ways or supports for the plate-holder and a ground-glass frame supported upon frame A, and adapted, through its connections therewith, to be swung between the said ways or supports or in rear of and parallel therewith, of the springs S, projecting from the inner face of the ground-glass frame to bear against the plate-holder, said springs being adapted to enter the opening in frame A when the ground-glass frame is closed, substantially as described.

FRANK A. BROWNELL.

Witnesses:
GEO. EASTMAN,
Z. L. DAVIS.